Figure 9:
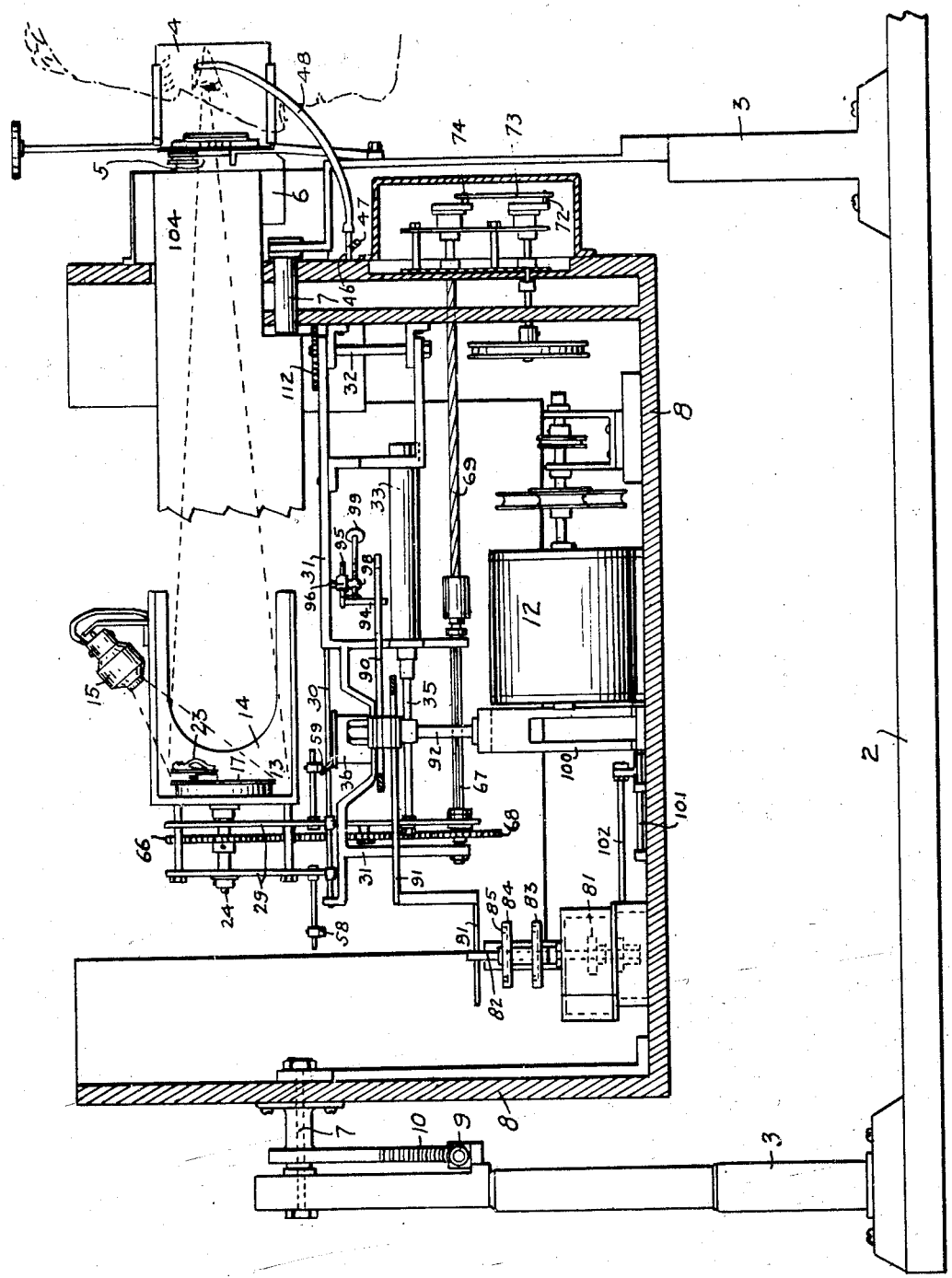

June 4, 1940.  A. A. WOELFEL  2,203,069
APPARATUS FOR EYE TREATMENT
Filed Dec. 16, 1935  5 Sheets-Sheet 1
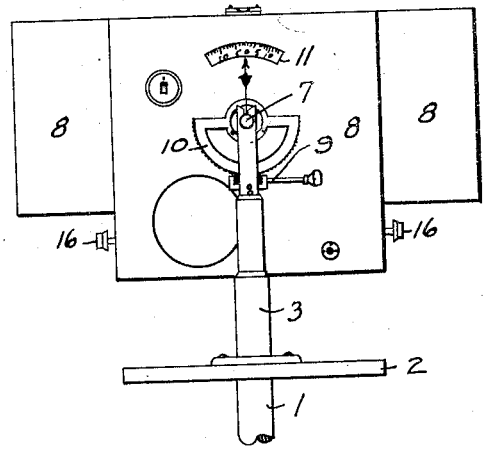
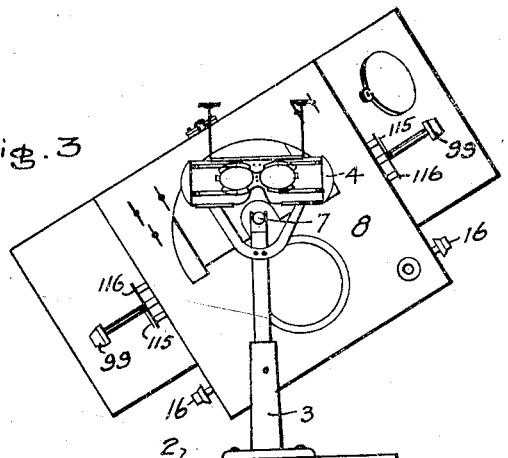
Inventor
Alphonso A. Woelfel
By
Attorney June 4, 1940. A. A. WOELFEL 2,203,069
APPARATUS FOR EYE TREATMENT
Filed Dec. 16, 1935 5 Sheets-Sheet 2
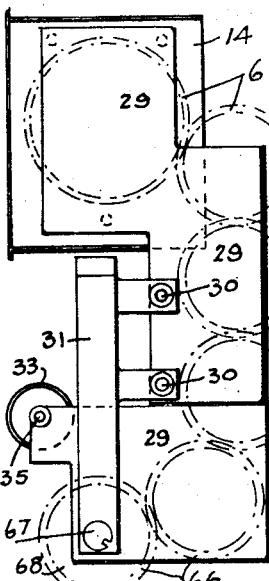
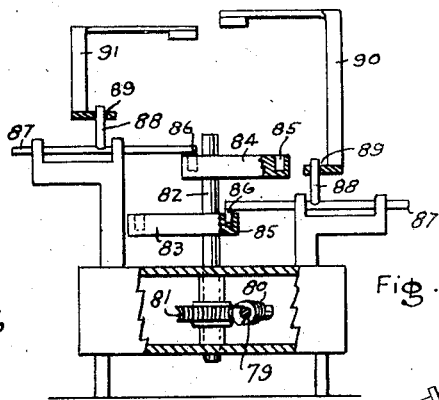
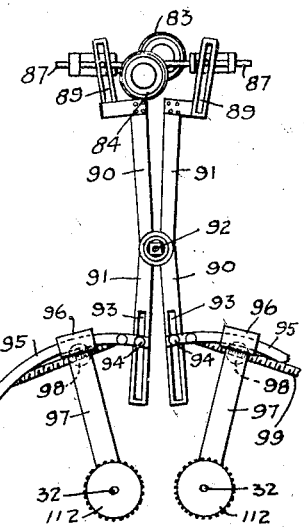
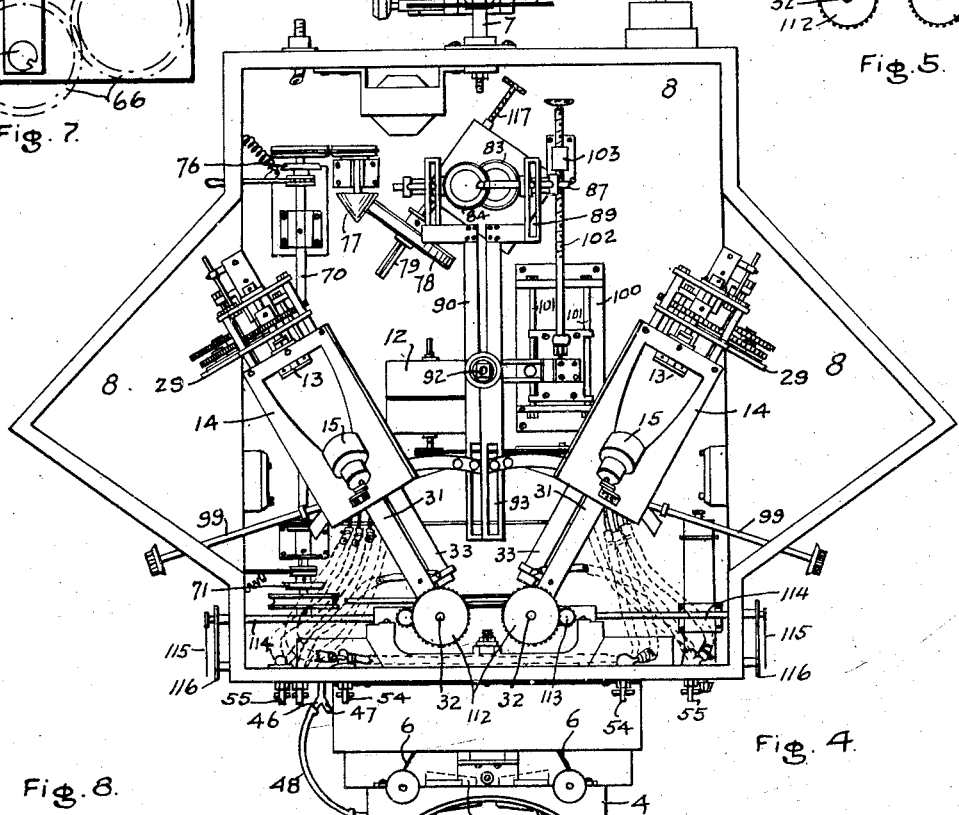
Inventor
Alphonso A. Woelfel
By
Attorney

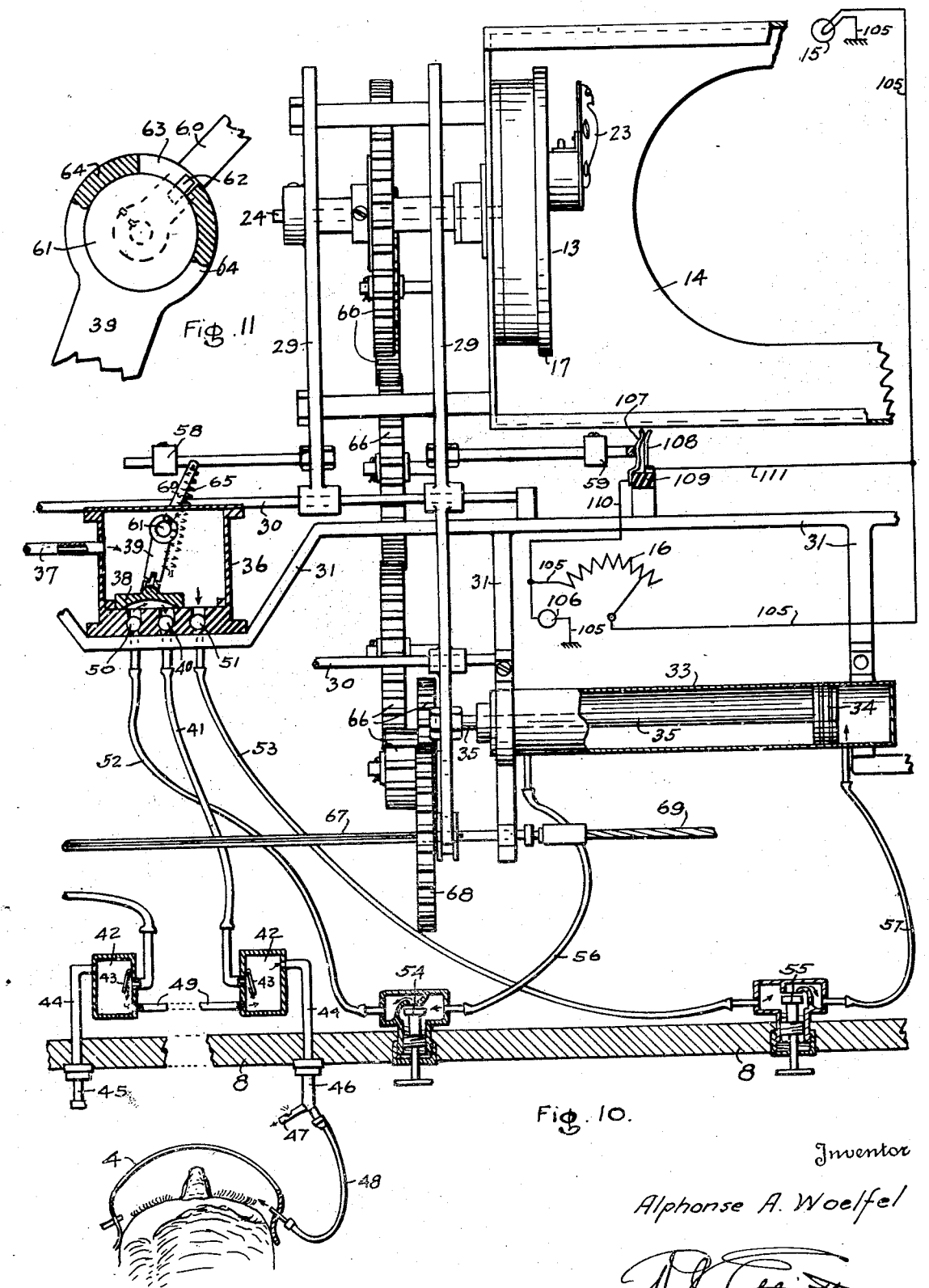

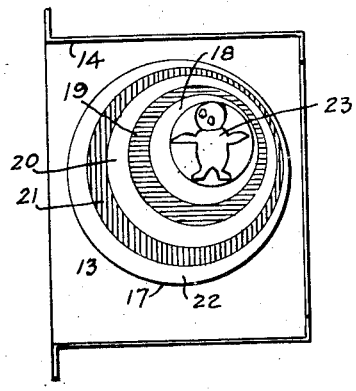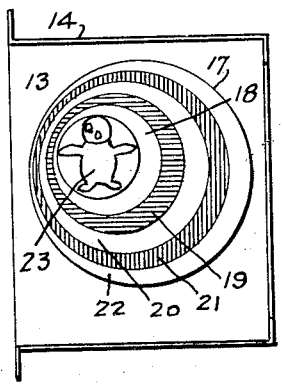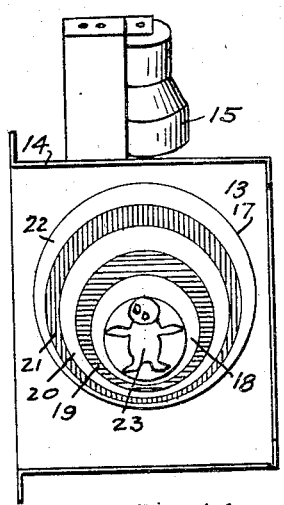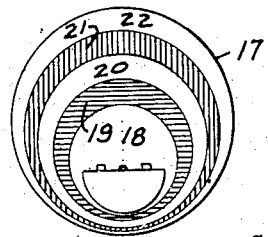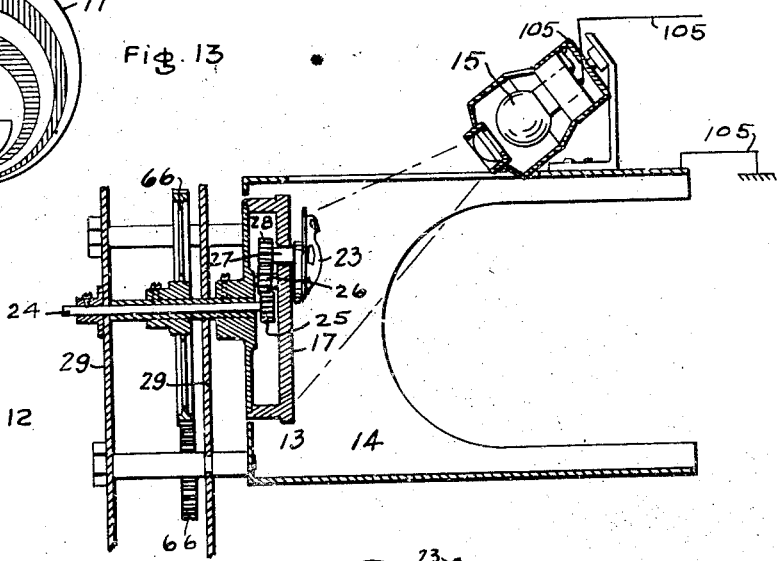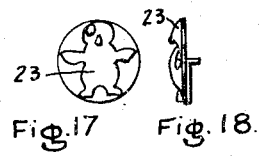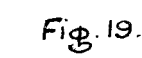

Patented June 4, 1940

2,203,069

UNITED STATES PATENT OFFICE 2,203,069

APPARATUS FOR EYE TREATMENT

Alphonso A. Woelfel, Tacoma, Wash.

Application December 16, 1935, Serial No. 54,696

14 Claims. (Cl. 128—76.5)

This invention relates to machines adapted to develop the muscles of the eye, and has special reference to machines for use in treating various abnormalities of the eyes, especially in their relation to each other, and in their ability to see objects equally.

The particular afflictions of the eye which are to be treated with this machine are known as heterophoria, strabismus, unequal ocular images, pseudo myopia, amblyopia, suspenopsia, color-blindness, and insufficient accommodation.

This apparatus not only acts through the optic nerve, that is to say by means of the reaction between the sight of the eye and the position, or motion, or color of the object seen, but it also further stimulates the nervous system, first, by the use of sound in connection with the reaction of the eye; second, by the use of the sensory nerves of the side of the face; and third, by the use of the mental sense of fear caused by the involuntary reaction of the eye and the brain to the motion of the approaching object seen.

The objects of this invention are to provide a mechanism which will cause an object or target, for each eye, to move continuously with a compound motion, such motion comprising a rotary motion in a plane, a lateral motion substantially at right-angles to the line of vision of the eye, and a longitudinal radial motion directly toward and away from the eye, said motions being entirely independent of each other and separately controlled and may be used either alone or in combinations with each other.

Another object of my invention is to provide an illumination for each target which may be accurately controlled in intensity.

Another object is to provide means whereby the illumination of the target is automatically controlled, through the longitudinal radial motion, so as to momentarily increase the illumination, with the effect of a flash, when the target is closest to the eye.

A further object is to provide a means of automatically causing a sound on that side of the patient on which the non-fixing eye is located.

A further object is to provide a means for blowing a slight puff of air against the face, in the vicinity of the eye, on that side of the patient on which the non-fixing eye is located.

A further object is to provide a means of controlling the extent and the speed of the longitudinal motion of each of the targets, separately.

A further object is to provide a means for tilting the apparatus in order to correct vertical deviations of the eyes.

A further object is to provide a means of stimulating the focusing of the eye by means of a moving target which is of three dimensions.

A further object of my invention is to provide a pair of targets, each of which is incomplete in itself but supplies the missing features of the other, thereby stimulating their fusion by creating a desire to see a complete picture.

A further object is to provide means whereby the two targets are rotated in unison while free to move laterally and longitudinally in independent degree and speed.

I attain these and other objects by the devices, mechanisms and arrangements illustrated in the accompanying drawings, in which Fig. 1 is a perspective view of the complete apparatus; Fig. 2 is rear view thereof; Fig. 3 is a front view thereof, showing the apparatus tipped to correct vertical deviation of the eyes; Fig. 4 is a plan view of the apparatus, the top cover being removed to reveal the interior of the cabinet; Fig. 5 is a plan view of the scissors mechanism whereby equal and simultaneous but opposite lateral motion is given to the targets, showing the scissors as partially opened; Fig. 6 is a rear elevation, partly in section, of the mechanism for operating the scissors mechanism; Fig. 7 is a rear elevation of the carrying frame, the target carriage and the target-operating train of gears; Fig. 8 is a front elevation of the means whereby the two driving shafts of the two target mechanisms are actuated in unison; Fig. 9 is a vertical longitudinal section of the cabinet showing the mechanism within the cabinet, the cover thereof being removed; Fig. 10 is a diagrammatic view showing the mechanism for the longitudinal motion of the target and the flashing of the lamp; Fig. 11 is an enlarged view showing the means for actuating the control valve of the pneumatic motor for the longitudinal motion of the target; Fig. 12 is a section of the target and its carrier; Fig. 13 is an elevation of the target disk, with the target figure removed therefrom; Figs. 14, 15 and 16 are similar views of the completed target in three consecutive positions in its rotation; and Figs. 17, 18 and 19 are front elevation, side elevation and plan of the target figure, respectively.

Similar numerals of reference refer to similar parts throughout the several views.

Referring to the drawings it will be seen that my apparatus is mounted on a suitable stand 1 in front of the patient, and that this stand includes a table 2 from which two standards 3 extend vertically upward. The front standard 3 carries the optical apparatus, including the headrest 4, the apparatus 5 for holding the lenses and prisms used in connection with the treatments, and the shutters 6 whereby vision of each eye may be confined to the target on the opposite side to it, when desired. These shutters 6 are mounted on turnable pivots which are vertically mounted in the headrest 4, on the outer sides of the lenses, and may be turned out of the line of vision or each may be turned inward to block off or occlude the line of vision to the hereinafter described target on the same side while allowing free vision to the corresponding target on the other side of the apparatus; that is to say, the left shutter 6 may be swung in front of the left eye to prevent its seeing the left target but permitting it to freely see the right target, and vice versa. These shutters are never used alone but both are used at the same time. Both of these standards 3 carry horizontal coaxial pivots 7 on which the frame or cabinet 8 of the machine is mounted, whereby the said cabinet may be tilted in relation to the said headrest 4, in order to correct vertical deviations of the eyes. The rear standard 3 carries a worm 9 meshing with the teeth of a suitable quadrant 10 connected to the machine frame so that by manually turning the said worm 9 the tilting of the frame 8 may be accurately controlled. A suitable indicator 11 is mounted on the frame to show the extent of such tilting. A suitable electric motor 12 is mounted on the floor of the cabinet 8 and operates, by means of belts and suitable transmitting mechanisms, the rotary motion of the targets 13 and the lateral motion thereof. The longitudinal motion of the two targets is operated by means of two pneumatic motors, each mounted on the laterally swinging frame and each independently controlled both as to speed and extent of motion and also, as to their relative forward and rearward motions, said pneumatic motors being operated by air pressure supplied to the machine from outside sources, not shown.

The apparatus

The description of one of the targets, its operation and control, will be understood to apply to the other since they are identical.

Each target 13 is mounted at the rear end of a light-shield 14 which carries it and through which light, from the small electric lamp 15, which is carried on the upper side of the said shield 14 and shines through an opening therein illuminating the said target in all its positions. The intensity of the light from the lamp 15 is controlled by means of a rheostat 16 mounted on the side of the cabinet 8 and the wiring of which may be short-circuited as hereinafter described when the shield 14 reaches its extreme forward position, thus causing the lamp 15 to momentarily increase the illumination of the target 13. The target 13 is compound in its nature and comprises a disk 17 mounted on the rear of the shield 14, said disk being provided with eccentric circles enclosing areas of different colors. For instance, I prefer to have the central circular portion 18 white, surrounded by an area 19 of blue, outside of which is an area 20 of white, and outside of that an area 21 of red, and outside of that again an area 22 of white. These eccentric circles enclosing these areas are each eccentric from the others, though their centers lie on a single straight line, that is to say the eccentricity of the innermost circle is greater than that next enclosing it, which in turn is greater than that next enclosing it, and so forth.

I mount in the center of the said innermost area 18 a secondary target 23 in such manner that the said secondary target, while it revolves around the axis of the disk 17, does not rotate on its own axis but always maintains the same position as it revolves. I prefer to form this target 23 of a suitable carving representing some well known object, such as a bird, and being formed in three dimensions. In certain cases and for certain purposes hereinafter described, the target 23 on one side of the cabinet may have certain features, such as a beak, eye, leg or wing, omitted, while the missing parts are supplied by the corresponding target 23 on the other side of the cabinet.

The fixed shaft 24, which forms the bearing for the disk 17, is suitably mounted in the carrying frame 29 and is provided with a fixed gear 25 in the rear of the disk 17. This disk 17 carries an idler gear 26 meshed with the said fixed gear 25, and also carries the pivot 27 on which the said secondary target 23 is mounted, and said pivot 27 carries a gear 28, with the same number of teeth as the first gear 25, and meshed with the idler gear 26 so that as the said disk 17 rotates, the secondary target 23 does not rotate but revolves. Thus the three gears 25, 26 and 28 form an epicyclic train.

The carrier frame or carriage 29, which supports the disk 17, shield 14 and lamp 15, is mounted on a pair of cylindrical rods or tracks 30 and this track is mounted on the swingable frame 31. Each said swingable frame 31 is mounted on its own particular pivot 32, said two pivots being supported by the cabinet and being positioned on each side of the central line of vision and near the lenses. The frame 31 also carries the pneumatic motor, comprising the horizontal cylinder 33, mounted parallel with the track 30, and having a piston 34 and piston rod 35 extending therefrom, said piston rod 35 being attached at its end to the carriage frame 29.

A control valve is mounted on the swingable frame 31 and comprises a valve box 36, into which the supply of air under pressure from the outside source is conducted by a suitable pipe 37. A suitable slide valve 38 is mounted within this valve box 36. The valve box 36 is provided with three ports and the said slide valve 38 is adapted to cover two of said ports at a time and to connect them together but to disconnect them from the third port. The slide valve 38 is operated by means of a swinging arm 39, suitably connected thereto in such manner as to allow the valve 38 to move horizontally while the arm 39 is turning through a certain angle.

The central or exhaust port 40 is connected by a flexible tube 41 to a chamber 42, past a check-valve 43, therein, and thus to the front of the cabinet 8. An outlet pipe 44 may either be plugged by a removable plug 45 or may be provided with a removable Y-piece 46. This Y-piece 46 is provided with a whistle 47 on one branch and with a tube 48 on the other branch, said tube 48 leading to and passing through the headrest 4 in such position that it is adapted to direct the puffs of air therefrom onto the side of the face. The two chambers 42, one for each of the motors 33, are connected together freely by means of the pipe 49, in such manner that the exhaust of both of said motors 33 passes out on the right side of the patient (as shown) or on the left side if so desired.

The two end ports 50 and 51 are connected by the tubes 52 and 53 to the control valves 54 and 55, positioned on the front of the cabinet 8 on that side of the center thereof on which the particular target is positioned, and the tubes 56 and 57 lead from the said respective valves to the rear and front ends of the cylinder 33. The piston 34 thereof is connected by the rod 35 directly with the carriage frame 29 and moves the said carriage on the track 30.

The carriage 29 is provided with two adjustable stops 58 and 59, each of which is adapted to contact and move an arm 60 on the valve box 36. The pivot 61 of the outside arm 60 forms the pivot of the inside arm 39, which is loosely mounted thereon. A pin 62 extends outward from the pivot 61 and rides loosely in the slot 63 in the boss 64 of the inside arm 39, in such manner that when the carriage 29 has reached the desired end of its stroke inward or outward, the said stop 58 or 59 will first move the outside arm 60 into central position, without moving the inside arm 39 at all, but so that as the carriage 29 continues, the pin 62 on the pivot 61 of the outside arm 60 engages the end of the slot 63 in the boss 64 of the inside arm 39 and moves it to shift the slide valve 38 into its opposite position, thus automatically reversing the pressure in the cylinder 33 and causing the piston 34 therein to reverse its motion. The outside arm 60 is provided with a spring 65 connected thereto and to the box 36 in such manner that as soon as it has been moved past the central position the said spring 65 will suddenly move it into its opposite extreme position, thus causing the motor 33 to suddenly reverse its motion.

Thus it will be seen that the extent of the forward and rearward motion of the carrier 29 may be accurately controlled by adjusting the positions of the said stops 58 and 59 thereon, and that the speed of both its forward or rearward motions may be accurately controlled by one or the other of the said valves 54 or 55 at the front of the machine.

The carrier 29, above described, also carries a train of gears 66 which connects a shaft 67 with the said target disk 17 and the target 23. The lowest gear 68 of the gear train 66, is slidably mounted on the shaft 67 and moves thereon with the motion of the said carriage 29. The rotary motion of the shaft 67 is transferred to the gear 68, and thus to the targets, by means of a key riding in the longitudinal slot or groove in the said shaft, or in any other convenient manner.

Since the track 30 and the frame 31 on which the carriage 29 moves, is also swingable on the pivot 32 in the cabinet, it is necessary to connect the said shaft 67 by means of a flexible shaft 69 to the driving mechanism.

This driving mechanism comprises the above-mentioned motor 12 which drives, through suitable belts, a counter-shaft 70 on which a friction clutch 71 connects, by other belting, with a central crank 72 mounted in the front wall of the cabinet 8. This central crank 72 is connected by means of a triangular connecting plate 73 (Fig. 8) with two other cranks 74 and 75, each of which is connected and drives the flexible shaft 69 on the respective sides of the central axis of the cabinet 8. Thus it will be seen that the single clutch 71, above described, controls the rotation of both the disks 17 of the targets. They therefore rotate synchronously and in the same direction.

It will be seen from the above description that both of the targets rotate in unison, but that they are separately controlled and operated so far as their longitudinal motion is concerned and so far as their illumination is concerned.

It has been above stated that the carriers and the targets, and all their operating mechanisms, may also be swung laterally to give an inward and outward swinging motion for the purpose of the correction of heterophoria or non-parallelism of the lines or vision of the two eyes. This is accomplished by means of the following mechanism:

It will be remembered that the motor 12 operates the counter-shaft 70, on which the above-described friction clutch 71 is mounted, and this said counter-shaft 70 is also provided with a second friction clutch 76 at its other end. This friction clutch 76 operates, by suitable belts, a conical friction cone 77, and this cone 77 contacts with an adjustable friction wheel 78 mounted on a shaft 79 and adjustable thereon by means of the screw 117 to contact different portions of the cone 77. The shaft 79 carries a worm 80 which meshes with a suitable gear 81 mounted on the vertical shaft 82. This vertical shaft 82 carries two cam-disks 83 and 84 which are oppositely eccentrically mounted thereon, the one above the other, and each of which is provided with a groove 85 adjacent its periphery. These grooves 85 are each engaged by suitable pins 86 mounted on and extending down from slidably guided rods 87. These rods 87 also have upwardly extending pins 88 thereon, said pins being adapted to engage in the respective slots 89 in the outer ends of a pair of scissors arms 90 and 91. These scissors arms 90 and 91 are mounted on the vertical pivot 92 at a point intermediate of their ends and cross each other at the said pivot point. The forward ends of the arms 90 and 91 are also provided with slots 93 which are in turn engaged by pins 94 mounted on the ends of the curved sectors 95. Each of these sectors 95 is slidably mounted in a sleeve 96 suitably secured to the end of the arm 97 forming a part of the carrying frame 31. As above stated, each of these carrying frames 31 is mounted on its own particular pivot 32, which is suitably supported in the cabinet 8. Each of the sectors 95 is concentric with its particular pivot 32 on which the whole target mechanism may be swung laterally.

The frame 31 which carries the entire target mechanism is adjustably connected to the said curved sector 95 by means of a suitable nut 98 on the arm 97 and a screw 99 mounted on the sector 95. The shank of the screw 99 extends out through a slot in the side of the cabinet 8 so as to be adjustable from the outside. Thus it will be seen that when the clutch 76 is thrown into engagement the two target carriers 31 are swung laterally, simultaneously, and equally in opposite directions, and that the particular angle in relation to the headrest 4 and the central axis of the cabinet may be differently adjusted on one side than on the other.

The extent of this lateral motion may be adjusted by moving the entire scissors mechanism in relation to the two pairs of pins 88 and 94 in the respective slots 89 and 93, by moving the pivot 92 thereof in the cabinet. This pivot 92 is mounted on a carrier 100 which is slidably mounted on the parallel guide tracks 101, parallel with the central axis of the machine, and is adjustable thereon by means of the hand operated screw 102 and the fixed nut 103, in such manner that as the said carrier 100 is thus drawn backward or rearward from the position shown in Fig. 4, it draws the entire scissors arm mechanism rearward with it, causing the pins 88 in the driving mechanism to slide forward in the slots 89, and also causing the pins 94 of the sectors 95 to slide forward in the slots 93 in the forward ends of the arms 90 and 91; so that, as it is thus drawn rearward from such position the extent of lateral motion of the target carriers 31 is increased.

In certain cases, as hereinafter set forth, the two targets are separated, so far as the visual action is concerned, by means of a septum 104 which is suitably and removably mounted in the cabinet and which prevents the line of vision of either eye crossing to the target on the opposite side.

The lamp 15 is mounted in a suitable electric circuit 105, energized from a suitable source of electricity 106, in which the rheostat 16 is connected and by which the degree of illumination of the target is controlled. The rheostat 16 may, however, be momentarily short-circuited, to flash the lamp 15, in the following manner: A pair of spring contacts 107 and 108 are mounted on an insulated block 109 secured on the frame 31 adjacent the end of the rod which supports the adjustable stop 59, above described, in such position that when the carriage 29 reaches the adjusted forward end of its stroke, the two said contacts 107 and 108 will be pushed together by the insulated end of the said rod. The contact 107 is joined by a wire 110 to one end of the rheostat 16, and the contact 108 by a wire 111 to the other end thereof.

The laterally swinging and adjustable frames 31 are each provided with an indicator comprising a toothed wheel 112, secured thereto concentric with the pivot 32 thereof, and a wheel 113 meshing therewith and suitably mounted in the cabinet frame and suitably connected by gears to a rod 114, extending out through the cabinet wall and provided with a pointer 115 adjacent to the scale 116 and indicating the angle which the frame 31 makes with the central axis of the machine. This angle is usually measured in prism diopters.

As above stated the supply of air under pressure is delivered to each of the motors 33 by the pipes 37. It is to be understood that the air is supplied by some suitable pump, outside of the apparatus, and that each of the said pipes 37 leading to the air motors is turned on or off by suitable hand-operated valves, not shown.

*The use of the apparatus for treatment of certain eye abnormalities*

When it is desired to treat heterophoria, in which the visual lines of the two eyes are not parallel the following method of operating the apparatus is used for the several types involved:

(1) *Exophoria; eyes tending to turn outward.*—The patient is seated before the instrument and a septum 104 is placed in position, and if necessary, convex prism lenses are placed in the lens holder 5 in the headrest 4. The targets are adjusted by means of the protruding screws 99 into corresponding or parallel positions. The motor 12 is started and the clutch 76, controlling the scissors motion, is then thrown into action to cause the frames 31 carrying the targets 13 to move outward to their extreme position and then the clutch 76 is disengaged. The switches controlling the lamps 15 are now turned "on" to light up both lamps to illuminate both targets and the rheostats 16 are adjusted to give the desired degree of illumination. Then the clutch 71, which connects the motor 12 to operate the disks 17 is closed, causing both the targets to revolve. Prisms, with the base outward, are now placed in the headrest 4 and the targets are adjusted by means of the protruding screws 99 to the position where fusion of vision takes place. The clutch 76, controlling the scissors movement, is now engaged thus causing the targets to move inward, towards each other and then outward to their former adjusted positions, and this successive inward and outward swinging movement of the targets causes the eyes to turn inward from the position of fusion while the rotary movement of the two targets brings all the extrinsic muscles into play, as well as attracts the attention of the patient. This action is maintained until the eyes become somewhat fatigued. At each sitting of the patient the adjustment is, of course, changed so that the patient gradually builds up a sufficient muscle tone to effect a cure. The dials 116 on each side of the cabinet register the amount of the deviation of the targets in prism diopters.

(2) *Esophoria; eyes tending to turn inward.*—In this case the treatment of the patient is similar to that for exophoria, above described, except that convex lenses with the prism base inward may be used and, also, instead of the scissors movement being adjusted at its maximum position as above described, adjustment is made for fusion while in its innermost position so that the scissors movement is outward from said position of fusion.

(3) *Hyperphoria; in which the line of vision of one eye is above that of the other.*—This is treated by placing the neutralizing lenses and prisms in the headrest to compensate for the position and distance of the targets, and the cabinet 8 is turned on its axial pivots 7 by means of the worm 9 and quadrant 10 in an opposite direction to that of the deviated eye. That is to say if the right eye turns upward the cabinet is tipped to bring the target which is on the right side below that which is on the left side, but not beyond the point of fusion. The targets are now rotated and the treatment continues until the defect is corrected.

In treating converging strabismus the septum 104 is removed. A pair of convex lenses or prisms may be placed in the headrest 4, if necessary. The shutters 6 are now moved so that the right eye will see only the left target and the left eye will see the right target. The targets are now adjusted laterally by means of the protruding screws 99 until fusion of vision takes place, when the scissors movement is at maximum position. If the targets do not fuse but one is above the other, then the cabinet is adjusted on its axis 7 to a position where both targets appear on the same plane. In this type of defect, one eye is the fixing eye while the other eye is non-fixing, or dormant. The illumination of the target which is seen by the fixing eye is reduced to a minimum by properly adjusting the rheostat 16 on the other side of the cabinet, while the illumination of the target seen by the non-fixing eye is increased by adjusting the other rheostat 16. In this type of case the three-dimension target 23 is of particular value and one is mounted on the target holder of each target or revolving disk 17. The target 23 before the non-fixing eye is complete in all but one or more details. The corresponding target 23, before the fixing eye, is provided with the parts omitted from the first target, and will not appear complete until fusion takes place. In some cases the targets 23 used are of such design that they will attract attention by playing on the inherent love or fear of the patient for some particular object. The pneumatic motor mechanism is now set in action before the non-fixing eye alone and the target before this eye is so regulated in its movement by means of the valves 54 and 55, that it will cause the patient to experience a nervous, startled, reaction akin to fear as it approaches the eye, since the motion is substantially directly along the line of vision and appears as though the target was about to strike the patient in the eye, thereby using the involuntary nerve reaction to hold and attract the fixation of this eye, and to stimulate it. As the target reaches the forward end of its movement, the illumination thereof is suddenly and momentarily increased by the carriage 29 closing the short-circuit 108 to 111 which cuts out the resistance of the rheostat 16, thereby producing a flash effect and further attracting the attention of and stimulating the inactive eye. This nervous involuntary reaction of fear may be increased or diminished by adjusting the valves 54 and 55 controlling the motion of the target so that the forward speed may be increased or decreased and so that the rearward speed may also be independently controlled. Also the extent of this forward-rearward motion may be adjusted to suit the conditions by shifting the position of the stops 58 and 59. The clutch 71, which controls the rotary movement of the targets is now thrown into engagement to cause the targets to rotate and, thereby exercise the muscles of the eye; and, since the targets turn in unison, they assist the two eyes to fuse the images. The exhaust air from the cylinder 33, which operates the forward-rearward movement of the target, is released through a suitable whistle 47, or other sound instrument, on the side of the cabinet on which the inactive eye is located, thus causing the auditory nerve on that side of the head to stimulate the reaction of the defective eye. Some of this exhaust air is blown against the same side of the face of the patient thus causing the sensory nerves to similarly cooperate with the optic nerve. When the patient shows sufficient improvement in the activity of the non-fixing eye, the position of the targets are adjusted by means of the protruding screws 99 so that they are brought closer together, thereby causing the eyes to swing nearer to parallel. The scissors movement is engaged when at its maximum position and the extent of the swing of the targets is adjusted to the minimum by turning the screw 102 in such manner as to carry the pivot 92 and the scissors arms 90 and 91 to their extreme forward position, substantially as shown in Fig. 4. These adjustments will naturally be done from sitting to sitting, and when sufficient improvement is shown then treatment is completed in the same manner as above described for esophoria.

In the treatment of divergent strabismus, in which the eyes turn outward, the same procedure is followed except that a septum 104 is used instead of the shutters 6 and the targets are adjusted on the same side as the eyes, and the case is then finished with the same procedure as that used in treating exophoria.

In treating vertical strabismus the cabinet is tipped on its axial pivots 7 to make the targets appear to be in the same plane and they are then made to revolve. The tipping of the cabinet is adjusted from sitting to sitting, in the opposite direction in which the eye turns until sufficient reserve is established. Forward-backward movement may also be used when necessary, with or without the rotary movement of the targets, taking advantage of the increased or decreased visual angle produced by the said forward-backward movement of the target. When the septum is removed and the two targets are made visible to both eyes and a compensating prism lens is placed in the headrest 4 to neutralize the working distance, three targets will be seen, if the targets are in line with the visual axis of both eyes, but if the targets are moved beyond the visual axis of either eye then four targets will appear to be seen. This phenomenon is due to the prism in front of each eye bending the light ray coming from the other target so that one target seen by each eye falls upon the fusional area of each eye and the image of the other target is focused to the periphery of the fusional area of each eye. The two central images, of the four, will fuse when the targets are properly adjusted; the remaining two images cannot fuse because they are seen outside of the fusional area of the retina.

The coloring of the eccentric rings which are painted on the disks 17 stimulate the peripheral portion of the retina, as well as tend to lead the eye to adjust itself so that the target on the disk will be in line with the visual axis. The red, blue, and white rings assist in developing fusion by keeping the peripheral portion of the retina occupied while the macular area is functioning.

In the treatment of color-blindness, the two targets are rotated and instead of using the normal above-described disks 17, similar disks having suitable colors predominating are used, and the shades of these colors are changed from time to time as the patient becomes able to recognize each color thus developed; or, the colors of the disk 17 may be unchanged while the supplementary target 23 is displaced by another disk of the desired color.

Insufficient accommodation is treated by the use of the forward-backward movement of one target at a time, while the other eye is occluded, or with both eyes functioning, with or without the use of prismatic effect. The target disks are made to rotate and may be adjusted to have the targets move forward and rearward in unison by suitable adjustment of the valves 54 and 55 in the front of the cabinet.

It is, of course, to be understood that many variations of my apparatus may be made, and that its operation may be varied to suit the particular circumstances and the judgment of the operator, the above apparatus and the above description of its use being given simply as one embodiment of the invention and a few of the many methods of using it, without departing from the spirit of the invention as outlined in the appended claims. As a sample of such variation it is, of course, possible to hang the supplementary target 23 on an eccentrically located pin, using the force of gravity to keep it from rotating as it revolves, instead of the described "sun-and-planet" mechanism; so too, other means of attaining the complementary lateral or transverse movement of the two targets will readily occur to the skilled mechanic, instead of the described scissors movement; or, other means may be devised for any of the above-described mechanisms, but I have described the apparatus as constructed and used by me as embodying the best means of accomplishing the results desired.

Having, therefore, described my invention, what I claim and desire to secure by Letters Patent, is:

1. Apparatus for the treatment of the eyes, comprising a pair of targets; means for holding the patient's head in fixed position; motor-driven means for moving said targets toward and away from the patient's head; a whistle positioned to one side of the patient's head; and means operatively connecting said whistle to said target-moving means and adapted to provide puffs of air to cause said whistle to sound, thereby stimulating the optic nerve on that side sympathetically with the auditory nerve.

2. Apparatus for the treatment of the eyes, comprising a pair of targets; means for holding the patient's head in fixed position; motor-driven means for moving said targets toward and away from the patient's head; a tube having an outlet adjacent to one side of the patient's head; and means operatively connecting said tube to said target-moving means and adapted to provide puffs of air to blow through said tube, thereby stimulating the optic nerve on that side of the head sympathetically with the sensory nerve.

3. Apparatus for the treatment of the eyes, comprising a target; means for holding the patient's head in fixed position; motor-driven means for moving the target toward and away from the patient's head; means to illuminate the target; and automatic means operated by said motor-driven means when said target is at the end of its movement nearest to the patient's head and adapted to cause said illumination thereof to momentarily increase.

4. Apparatus for the treatment of the eyes, comprising a target; means for holding the patient's head in fixed position; motor-driven means for moving the target toward and away from the patient's head; means to illuminate said target; means to reduce the illumination thereof; and automatic means operated by said motor-driven means, when said target is at the end of its movement nearest the patient's head, to momentarily restore the full illumination thereof.

5. Apparatus for the treatment of the eyes, comprising a supporting frame; a pair of swingable frames independently pivoted thereto; an actuating motor operatively connected to said swingable frames to continuously swing both said frames simultaneously and transversely in mutually opposed directions; targets rotatably mounted on each said swingable frame; and flexible actuating means operatively connecting said motor to both of said targets to rotate them on said swingable frames as said frames are being swung transversely.

6. Apparatus as set forth in claim 5, wherein the operative connection between said actuating motor and said swingable frames includes an adjustable friction drive, whereby the speed of said transverse swinging of said frames may be controlled without changing the speed of rotation of said targets.

7. Apparatus for the treatment of the eyes, comprising a supporting frame; a pair of swingable frames independently pivoted thereto; a scissors mechanism comprising a pair of crossed levers pivoted together at their crossing point and to said supporting frame; an actuating motor operatively connected to one end of said scissors mechanism to continuously open and close said mechanism; sectors connecting the other end of said scissors mechanism to the two said swingable frames respectively, whereby said frames are continuously swung on their pivots in transverse and opposite directions; targets rotatably mounted on said swingable frames; and flexible means operatively connecting said motor to both of said targets to rotate them on said frames as said frames are being swung transversely.

8. Apparatus as set forth in claim 7, wherein the pivot of said scissors mechanism is longitudinally adjustable on said supporting frame relative to the motor connection and said sectors; together with means to so adjustably move said pivot, whereby the extent of transverse swinging of said swingable frames is adjusted.

9. Apparatus as set forth in claim 7, together with means to adjustably move said pivot on said supporting frame, whereby the extent of transverse swinging of said swingable frames is adjusted; and together with adjustable means incorporated with said sectors, whereby the virtual lengths of said sectors may be independently adjusted and whereby the transverse position of the arc of travel of each said target may be independently adjusted without interfering with the extent of such arc of travel.

10. Apparatus for the treatment of the eyes, comprising a supporting frame; a track mounted thereon and extending substantially in the line of vision; a carriage mounted on said track; a reciprocating motor parallel with said track and operatively attached to said carriage to reciprocate it thereon; a target rotatably mounted on said carriage and reciprocated therewith; and a rotating actuating motor operatively connected to said target to rotate it as said carriage is being reciprocated on said frame.

11. Apparatus as set forth in claim 10, together with reversing means for changing the direction of motion of said reciprocating motor; and adjustable means mounted on said carriage and engaging said reversing means, whereby the extent of the motion of the carriage on the track may be controlled.

12. Apparatus for the treatment of the eyes, comprising a supporting frame; means, forming a part of said frame, for holding the patient's head in fixed position; a pair of swingable frames pivoted to said supporting frame; an actuating motor operatively connected to said swingable frames to continuously swing said frames simultaneously, oppositely and transversely to the central line of vision; targets mounted on said swingable frames; and two independent shutters mounted in said frame adjacent the patient's two eyes and each adapted to occlude only the direct vision of the adjacent eye and thereby to cause the lines of vision to cross and engage the target adjacent the other eye.

13. Apparatus for the treatment of the eyes, comprising a support; a headrest mounted on said support for holding the patient's head in fixed position; a pair of coaxial horizontal pivots suitably mounted on said support and positioned substantially in the central line of sight of the patient's eyes; a cabinet mounted on said pivots and adapted to be tilted thereon in respect to said headrest; a pair of independent targets mounted in said cabinet, lying in the lines of vision of the respective eyes of the patient; and means for continuously moving said targets.

14. Apparatus as set forth in claim 13, together with means for tilting said cabinet on its pivots and for holding said cabinet in tilted position.

ALPHONSO A. WOELFEL.